(12) United States Patent
Bartolome (10) Patent No.: US 7,542,607 B2
(45) Date of Patent: Jun. 2, 2009

(54) DIGITAL PEN AND PAPER

(75) Inventor: Emiliano Bartolome, Pontevedra (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 842 days.

(21) Appl. No.: 11/110,775

(22) Filed: Apr. 21, 2005

(65) Prior Publication Data

US 2005/0249415 A1    Nov. 10, 2005

(30) Foreign Application Priority Data

Apr. 28, 2004    (GB)    ................... 0409417.3

(51) Int. Cl.
*G06K 9/00* (2006.01)
*G06K 9/46* (2006.01)
(52) U.S. Cl. .................... 382/187; 382/188; 382/203
(58) Field of Classification Search ................ 382/187, 382/188, 203, 314
See application file for complete search history.

(56) References Cited

U.S. PATENT DOCUMENTS

| 4,668,963 | A  | * | 5/1987 | Tanabe et al. | ........... 346/139 C |
| 5,627,349 | A  | * | 5/1997 | Shetye et al. | ............ 178/18.01 |
| 5,943,137 | A  | * | 8/1999 | Larson et al. | ............... 358/403 |
| 6,456,740 | B1 | * | 9/2002 | Carini et al. | ................ 382/187 |
| 6,573,887 | B1 |   | 6/2003 | O'Donnell, Jr. | |
| 2002/0107885 | A1 | * | 8/2002 | Brooks et al. | ............... 707/505 |
| 2003/0029919 | A1 |   | 2/2003 | Lynggaard et al. | |

FOREIGN PATENT DOCUMENTS

| WO | WO 01/61636 | 8/2001 |
| WO | WO 03/042912 | 5/2003 |

\* cited by examiner

*Primary Examiner*—John B Strege (57) ABSTRACT

A digital pen and paper system comprises a pen arranged to make pen strokes on a document having a plurality of regions, to detect markings on the document, and to record them in a series of samples. The system is arranged to determine from the samples the position of the pen strokes. The system has defined therein a plurality of different warning conditions that determine when a warning will be produced in response to lost samples, and is arranged to select one of the warning conditions for one of the pen strokes depending on which of the regions the pen stroke is made.

20 Claims, 5 Drawing Sheets

DIGITAL PEN AND PAPER

FIELD OF THE INVENTION

This invention relates to digital pen and paper systems, and in particular to the control of warnings produced by such systems when the pen's position detection system is not functioning optimally.

BACKGROUND OF THE INVENTION

Digital pen and paper systems—sometimes called pen computing systems—are known in which a document includes a position identification pattern made up of markings printed on the document which can be detected by a suitable detection system and used to distinguish different positions on the document.

It is known to use documents having such position identification markings in combination with a pen or other device having an imaging system, such as an infra red camera, within it, which is arranged to image a small area of the page close to the pen nib. The pen includes a processor having image processing capabilities and a memory and is triggered by a force sensor in the nib to record images from the camera as the pen is moved across the document. From these images the pen can determine the position of any marks or strokes made on the document by the pen. The markings can be stored either directly as graphic images, or perhaps as a sequence of positions on the document each with an associated time stamp, which can be passed from the pen to a suitable processor such as a personal computer.

The combination of the pen and the patterned paper allows, for example, forms with checkboxes on to be provided and the markings of the check boxes with the pen to be detected. In further applications the pen stokes recorded by the pen may be analysed to recognise handwriting characters. An example of a system which employs this type of digital paper is known from Anoto AB.

A problem can arise where the pen does not capture the pattern information correctly and therefore cannot tell where it is on the document. In this case, a warning may be issued to the user so they are aware that a stroke has not been captured correctly. In one known pen, sold under the name Logitech lo by Logitech, the pen includes a buzzer which issues a warning by making the pen vibrate whenever a predetermined number of consecutive image samples—typically 5—are lost. A sample is considered lost when the position on the document cannot be determined from the pattern in the image sample. The most usual cause of errors is a misprint of the pattern which reduces either the clarity, or the accuracy of position, of the markings, although errors can occur if the pen is moved too quickly for samples to be captured. Repeated warnings are undesirable as they reduce the confidence of the user in the device. It is therefore desirable to reduce the number of errors that are reported. This has been achieved in the past in several ways.

One way of reducing the number of warnings issued is to allow the pen to lose a number of samples within a stroke without issuing a warning. Typically a warning is only issued if five consecutive samples are lost.

Other solutions have been based on increasing the quality of the pattern printing or searching for more robust pattern types. Improving the visibility of the pattern can be achieved by using inks with different frequency absorption to other markings on the document so that nothing obscures the pattern and the pen can always detect it. However this complicates printing of the documents. Using more accurate printing techniques to print the pattern markings also helps but increases the cost of printing.

SUMMARY OF THE INVENTION

According to a first aspect of the invention there is provided a digital pen and paper system comprising a pen arranged to make pen strokes on a document having a plurality of regions, to detect markings on the document, and to record them in a series of samples, wherein: the system is arranged to determine from the samples the position of the pen strokes; the system has defined therein a plurality of different warning conditions that determine when a warning will be produced in response to lost samples; and the system is arranged to select one of the warning conditions for one of the pen strokes depending on which of the regions the pen stroke is made in.

According to a second aspect the invention provides a digital pen and paper apparatus which includes a digital pen having a writing stylus adapted to write handwritten markings onto a surface and which is adapted to capture those handwritten markings digitally, in which the apparatus is adapted to behave in a different way when processing information captured from different regions on a document, and in which the differing behaviour comprises different decisions about warnings to be issued to a user to indicate that information has been captured incorrectly by the pen.

The apparatus may include: an information capture means arranged to capture a sequence of a location information samples, for example corresponding to at least two positions along a stroke made on a document by the pen. It may also include a memory having a warning condition stored therein. It may also include a processing system which is adapted to analyse information from the samples to identify the location on the document at which at least one of the samples is captured, to identify a warning condition associated with that location, to identify lost information samples from which the location cannot be determined, and to generate a warning signal if the warning condition is met by the lost information samples.

By providing a warning condition and associating the warning condition with a particular point within a region on a document, and then using this in determining whether or not to issue a warning, the apparatus can behave differently when strokes are made in different regions or positions on a document. This considerably enhances the versatility of the warnings that the pen issues, tailoring the way in which warnings are issued to different regions of a document. Prior art pens have always exhibited the same behaviour regardless of the region of the document on which markings are made.

The warning condition may indicate whether or not a warning is to be issued for a particular type of error detected when making a stroke on a particular region of a document and hence part of a document. For instance, the warning condition may tell the pen never to issue a warning when marking on a particular region of pattern, regardless of whether any lost samples or other errors occur. At the other extreme, it may tell the pen to issue a warning as soon as a single sample is captured in which the document region cannot be identified. The warning condition therefore allows the sensitivity of the pen's warning system to be varied on different parts of a document.

The warning condition may be stored in the memory as a map of all regions that may be found on a document cross-referenced to an associated error action or behaviour, such as an error value. The pen memory may therefore in effect be pre-loaded with information about the pattern used on a document and information which tells the pen how to behave when marking each part.

In an alternative, the memory may be preloaded with information about only certain regions of a document cross-referenced to the appropriate error information. Whenever a region is marked which is not stored in the memory the pen may apply some default error information which tells the pen how to warn a user of errors.

It should be understood that a complete set of documents can be handled in this way with the pen loaded with region information and warning condition information that is generic to many documents. For instance, a set of documents may use the same regions whenever it is desired to provide a functional region such as a checkbox, or tick box, and a different region for areas in which text is to be written.

The warning condition may cause the pen to produce a warning signal more readily in areas in which high levels of detail about strokes is needed, and less relatively in areas where only crude stroke information is needed such as a checkbox or tick box to indicate that it has been selected.

Typical regions of a document or documents which may be allocated warning conditions include, but are not to be limited to: tick boxes, check boxes, radio buttons, text boxes, text areas, free text areas, drawing areas or boxes.

The pen, which includes a nib or writing stylus for making the strokes, may include a pressure sensor which provides an output signal indicative of the pressure applied to the nib.

The memory in which the warning condition information is stored may also be provided on the pen. In an alternative the memory may be provided as a part of the apparatus which is remote from the pen. For example, the pen may capture information which is sent to a remote device for processing. The processing may therefore occur off-pen with the memory located at the remote device. In a still further alternative the processing may occur on the pen with the pen accessing the error information from a remote device which includes the memory in which the error information is stored.

The warning means may also be on the pen or off pen. In a preferred embodiment the warning means may comprise an actuator which causes the pen to vibrate to indicate a fault to a user. The pen may also or alternatively include a warning means which comprises a light or buzzer or speaker for providing visual and audible fault indications.

The warning means could, of course, be provided off pen. A separate buzzer or light may be provided which provides the user with a warning of a fault.

The warning signal generating means may be adapted to provide a warning when one, or two, or three or more consecutive errors (samples in which the region cannot be determined) are made in a row. The exact number may be predetermined or may be indicated by the error information.

To function correctly the pen needs to be able to capture information from the document which tells the pen which region of the document is being marked. The location information capture means performs this function, and it is errors that occur in the captured information that are the primary source of errors in determining location. In a most preferred arrangement, the document may be marked with a pattern of position identification markings and the location information capture means may comprise a digital camera which is part of the pen and which images a region of the document adjacent the stylus.

Each captured image should contain an image of the pattern marking from which the pattern can be determined and hence the position. If a different portion of pattern is used for each region of every one of a set of documents, this not only allows the region on a document but also within a set of documents to be determined.

Where pattern is used, the warning condition may be associated with one or more blocks of pattern. For example, the pattern may be two dimensional such that a position within the space can be indicated by an X and Y coordinate. The warning condition information may identify regions as rectangular blocks of pattern space defined by upper and lower X and Y coordinates.

According to a further aspect the invention provides a method of processing data samples from a digital pen and paper system comprising a pen arranged to make pen strokes on a document having a plurality of regions, and to capture the data samples from the document, the method comprising: determining from the samples the position of the pen strokes on a document; and selecting one of a plurality of different predetermined warning conditions that determine when a warning will be produced in response to lost samples; wherein the warning condition is selected for one of the pen strokes depending on which of the regions the pen stroke is made in.

The method may comprise only generating an error signal for strokes made in some predetermined regions of a document and not in other regions.

The method may comprise capturing a first sample for a stroke and determining the position on the document indicated by the sample. If the position can be determined then the sample is stored in memory, if not a "sample lost" flag may be raised or a sample lost value is stored instead.

The method may then proceed to capture the next sample in the sequence. If the position is identified in this sample then it may be stored in place of the lost sample value or, where appropriate the lost sample flag may be lowered.

If the position is not identified, and it is not the first sample captured for a stroke, then an error signal may be generated and a warning issued. The method may determine whether or not to issue such a warning depending on whether a previous position has been stored in the memory for that stroke and also dependent on the warning condition associated with the stored position. The warning condition can therefore be used to alter the way in which the pen decides to issue a warning depending on which part of a document is being marked.

As a pre-requisite, the method may also includes steps of allocating a warning condition to different regions or positions on a document prior to marking the document with a pen. The method may include storing the information in a memory such as a memory of a pen. The warning conditions may be allocated according to the function that a region of a document is to be given. For example, the method may allocate warning conditions to tick boxes, check boxes or the like which make it less likely that an error signal is to be generated than for text boxes or the like.

Corresponding data carriers for carrying data arranged to control a digital pen and paper system to carry out the methods of the invention, and to operate as systems of the invention are also provided. The data carrier can comprise, for example, a floppy disk, a CDROM, a DVD ROM/RAM (including +RW, −RW), a hard drive, a non-volatile memory, any form of magneto optical disk or any other form of computer readable medium.

BRIEF DESCRIPTION OF THE DRAWINGS

There will now be described by way of example only one embodiment of the present invention with reference to and as illustrated in the accompanying drawings of which.

Figure 1:
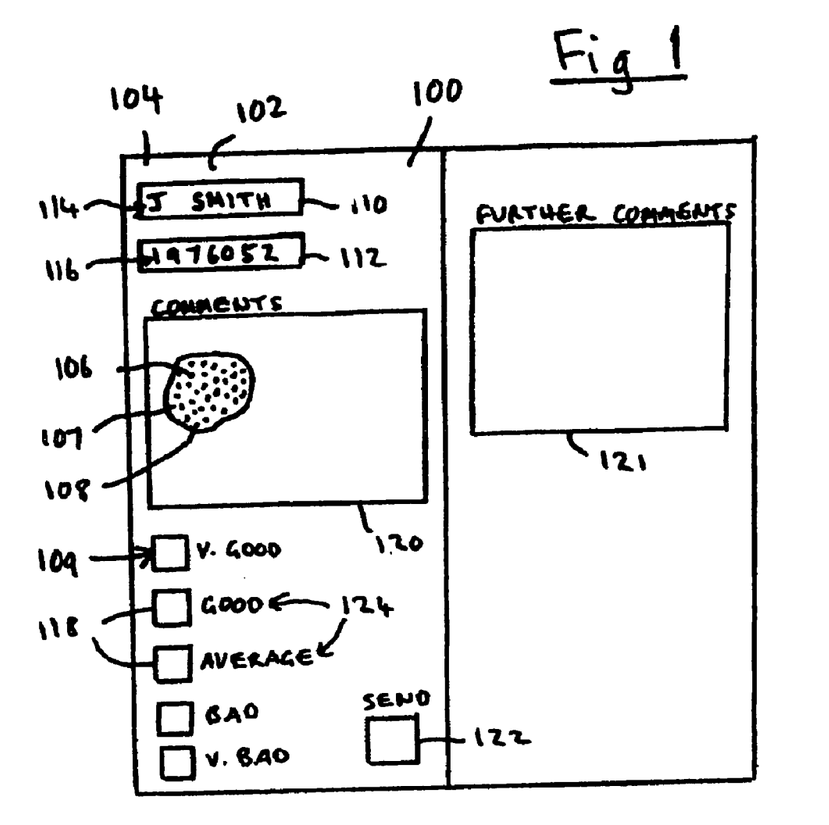
FIG. 1 shows a document suitable for use with a processing system according to an embodiment of the invention.

Referring to FIG. 1 a printed "digital" document 100 for use in a digital pen and paper system comprises a carrier 102 in the form of a single sheet of A4 paper 104 with position identifying markings printed on some parts of it to form areas 107 of a position-identifying pattern 108. These background markings are referred to as "pattern" in this text. Also printed on the paper 104 are further markings 109 which are clearly visible to a human user of the form, and which make up the content of the document. The content 109 will obviously depend entirely on the intended use of the document. In this case an example of a very simple two-page questionnaire is shown, and the content includes a number of boxes 110, 112 which can be pre-printed with specific information such as the user's name 114 and a document identification number 116.

Figure 2:
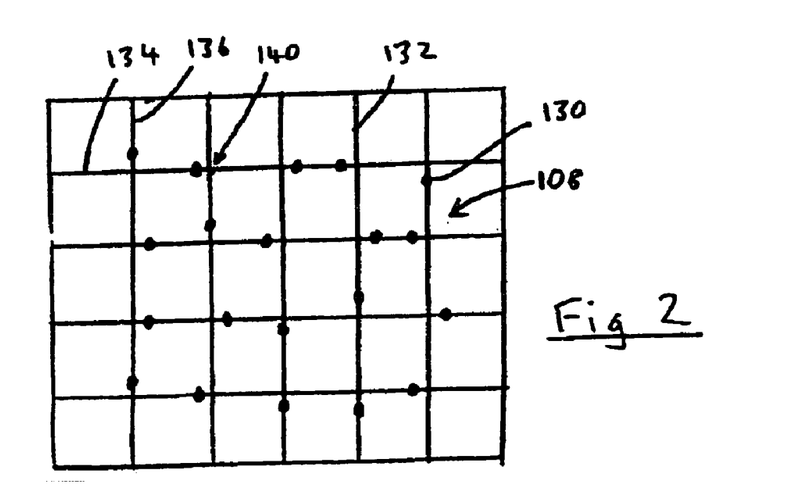
FIG. 2 shows in detail part of the document of FIG. 1.

The position-identifying pattern may have many forms but one suitable example is that shown in an enlarged schematic form in FIG. 2. The position-identifying pattern printed on the document is made up of a number of dots 130 arranged on an imaginary grid 132 having a grid spacing of about 300 μm. The grid 132 can be considered as being made up of horizontal and vertical lines 134, 136 defining a number of intersections 140 where they cross. One dot 130 is provided at each intersection 140, but slightly offset in one of four possible directions up, down, left or right, from the actual intersection. The dot offsets are arranged to vary in a systematic way so that any group of a sufficient number of dots 130, for example any group of 36 dots arranged in six by six square, will be unique within the pattern space. An example of this type of pattern is described in WO 01/26033. It will be appreciated that other position identifying patterns can equally be used. Some examples of other suitable patterns are described in WO 00/73983 and WO 01/71643.

Figure 3:
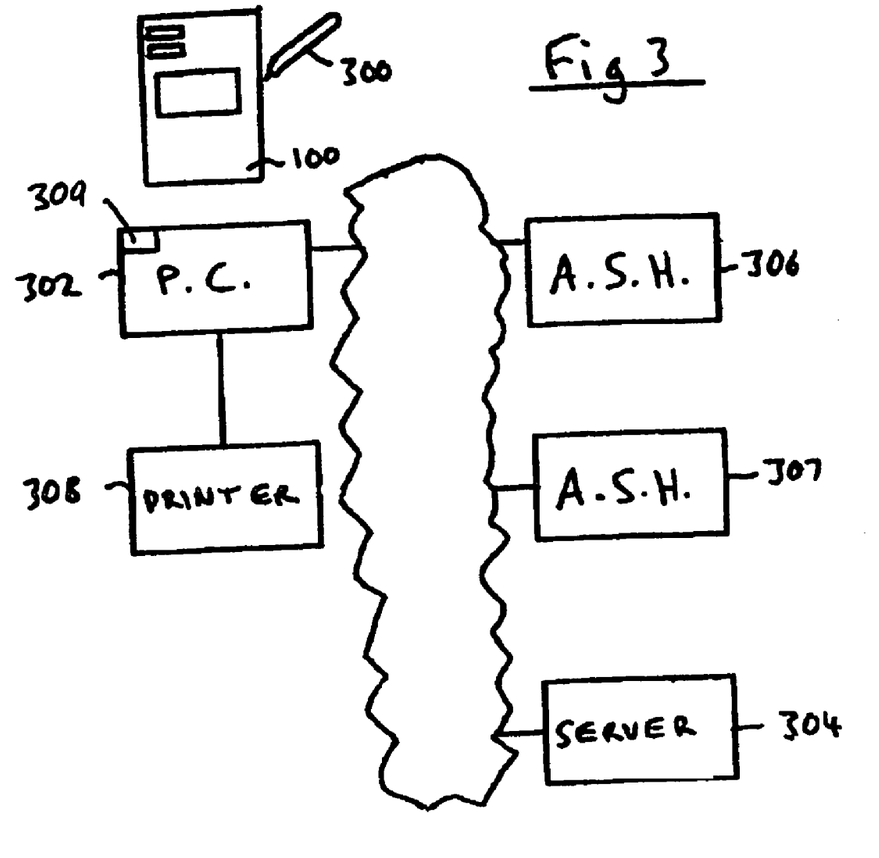
FIG. 3 shows a computer system according to a further embodiment of the invention arranged to process information from the document of FIG. 1.

Referring to FIG. 3 an internet based system according to an embodiment of the invention for using the document 100 comprises a pen 300 arranged to write on the document 100 and to detect its position on the document from the pattern 108, and an internet connected personal computer (PC) 302 arranged to run an application for processing data from the pen 300, for example by modifying a file in which the document 100 is stored electronically in response to pen strokes made on the document 100 with the pen 300. The PC 302 includes a user interface including a screen 314, a keyboard 316 and a mouse 318, as well as a processor, a memory, and I/O software devices by means of which the processor communicates with the screen 314, the keyboard 316, the mouse 318 and a communications port by means of which it communicates with the internet. The PC 302 is connected to a printer 308. The system also includes an internet connected server 304 referred to here as an EPLS (electronic paper lookup service) which has stored on it a database of records of which areas of the pattern space are allocated to which documents.

An application service handler (ASH) 306, which is a program run, in this case, on a separate server having its own memory, processor I/O devices and communications port, is also provided with Internet connection. The ASH 306 is arranged to interpret the pen strokes recorded by the pen 300, as described below, converting them to an input suitable for the application on the PC 302. The ASH includes an optional image character recognition (ICR) program so that it can interpret handwritten input on the document 100 and convert it to digital text. A further ASH 307 is also provided, and is associated with a different application and arranged to interpret pen strokes for that application. In this embodiment there is one ASH for each application that makes use of the digital pen and paper system. Each ASH 306, 307 needs to have a record of the layout of any particular document 100 including the positions, dimensions and functions of each of the patterned areas so that it can process any pen strokes made on the document 100.

A local paper lookup service (LPLS) 309 is also provided on the user's PC which has an internet connection. This is a proxy service arranged to receive data from the pen when the pen has been used on the document 100, the data identifying which areas of pattern space have been written on. Typically the pattern space that is associated with the send box 122, and which the pen 300 has recognized as a prompt to contact the LPLS, is identified to the LPLS 309. The LPLS may be able to determine from locally held data which ASH to use to process the pen information. If not, the LPLS 309 is arranged to interrogate an Enterprise paper look-up service (EPLS) database on a central, network connected server 304 to determine the unique identity of the printed copy of the document 100. The EPLS includes a database indicating which application a printed copy of a document is associated with, and therefore which of the ASHs 306, 307 should be used for that application. The EPLS identifies the appropriate ASH 306 and the document identity to the pen. The pen can then send the pen stroke data and the document identity to the correct ASH 306, 307.

It will be understood that the various components of the system can all be located at separate locations, communicating via the internet as described. Alternatively some or all of them could be provided together on a single server, or grouped on a local network. This might be appropriate where a self-contained system for a limited number of applications is required.

Figure 4:
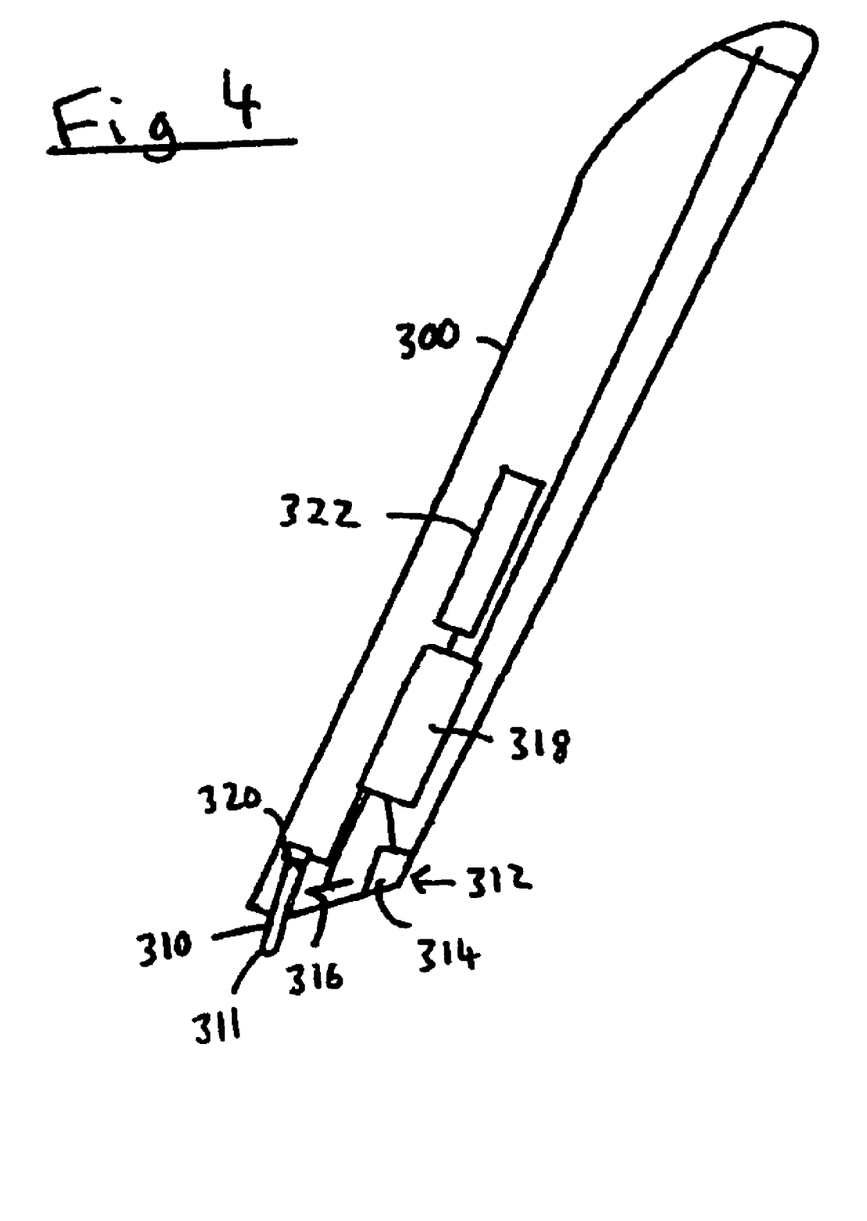
FIG. 4 shows a pen forming part of the system of FIG. 3.

Referring to FIG. 4, the pen 300 comprises a writing nib 310, and a camera 312 made up of an infra red (IR) LED 314 and an IR sensor 316. The camera 312 is arranged to image a circular area of diameter 3.3 mm adjacent to the tip 311 of the pen nib 310. A processor 318 processes images from the camera 312 taken at a sample rate of about 80 Hz. A pressure sensor 320 detects when the nib 310 is in contact with the document 100 and triggers operation of the camera 312.

Whenever the pen is being used on a patterned area of the document 100, the processor 318 can therefore determine from the pattern 108 the position of the nib of the pen whenever it is in contact with the document 100. Samples are captured at regular intervals as a stroke is made with each sample indicating the position of the pen on the document at the time that the sample is captured. From these samples the pen can determine the position and shape of any marks made on the patterned areas of the document 100 by connecting together the captured positions. This information is stored as pen stroke data in a memory 322 in the pen as it is being used.

When the user has finished marking the document, in this case when the questionnaire is completed, this is recorded in a document completion process, for example by making a mark with the pen in the send box 122. The pen is arranged to recognise the pattern in the send box 122 and determine from that pattern the identity of the document 100. It then sends this document identification information to the EPLS server 304, which identifies the relevant ASH 306 to the pen 300, by sending the network address (e.g. a URL) of the ASH 306 to the pen 300. The pen stroke data is then sent by the pen 300 to the ASH 306 which converts it to a suitable format for input to an application, which can be running on the PC 302, for processing the pen strokes. The pen 300 can be connected to the network in any suitable manner, but in this case it is via a Bluetooth radio link with the PC 302. Suitable pens are available from Logitech under the trademark Logitech Io using a USB connection.

As discussed, the pen 300 identifies the strokes made on the document by analysing the pattern within each image captured by the camera. The pattern tells the pen where it is on the document and information from the pressure sensor tells the pen that the user is pressing the pen nib on to the document to write or is holding the pen clear of the document. However, there may be instances where the pen cannot determine from the pattern in a captured image sample the position of the pattern in that sample, and hence its own position on the document. This is known as a lost sample. In such cases it is important to provide feedback to the user as the pen in effect will not know where on the document the stroke has been made. The feedback tells the user that the stroke is not being captured correctly and that an error has occurred. Typical reasons for failure include mis-printing of the pattern, moving the pen too quickly or dirt on the camera lens. If only one sample is lost the processor 318 in the pen can estimate the position of the lost sample from the samples before and after it. A similar estimation can be made even if larger numbers of samples are lost consecutively. However, the greater the number of consecutive samples lost, the less accurate the estimation will be. The pen is therefore arranged to provide feedback, in the form of a warning to the user, if the number of lost samples exceeds a predetermined limit.

Providing feedback to the user to indicate an error provides an inconvenience to the user. In order to minimise this inconvenience, and ensure that warnings are only produced when they are necessary, the pen is arranged to identify different regions of the document and to use different warning conditions for the different regions. In each region a warning will only be produced if the warning condition associated with that region is met. For many areas of a document it is envisaged that more lost samples can be tolerated than in others, and the warning conditions for the different regions of the document therefore define different numbers of consecutive samples that can be lost before a warning is produced.

The pen includes an area of memory in which is stored warning information. This information tells the pen how to behave when marking different regions of a document and in particular defines the warning conditions that influence or controls the issue of warning signals. The warning information comprises a description of one or more regions of pattern which are used on a document and the warning conditions associated with those regions. This information is stored before the pen is used on a document.

In this embodiment the warning information comprises a map defining regions of pattern, for example by means of coordinate references, along with a warning condition associated with each region of pattern. It is the warning condition that indicates to the pen how it is to respond to lost samples when marking its associated region on the document, and when a warning is to be produced.

For the document of FIG. 1, the description includes several regions of pattern selected from the pattern space which correspond to each of the tick boxes 118. The warning condition associated with each tick box comprises a "High error tolerance" condition. This is because it is considered sufficient to know that a stroke is made in a tick box without capturing a full stroke. The description also includes a "Low error tolerance" warning condition associated with those areas 120, 121 in which the user is expected to enter text. This is because capturing text with accuracy requires high detail of a stroke to be captured.

The pen is therefore adapted to behave differently when processing a captured pen stroke depending on whether it is from an area of the document which includes pattern in a "low error tolerance" area or a "high error tolerance" area. In this example the pen does so by applying an algorithm as set out in the flow diagram of FIG. 5.

Figure 5:
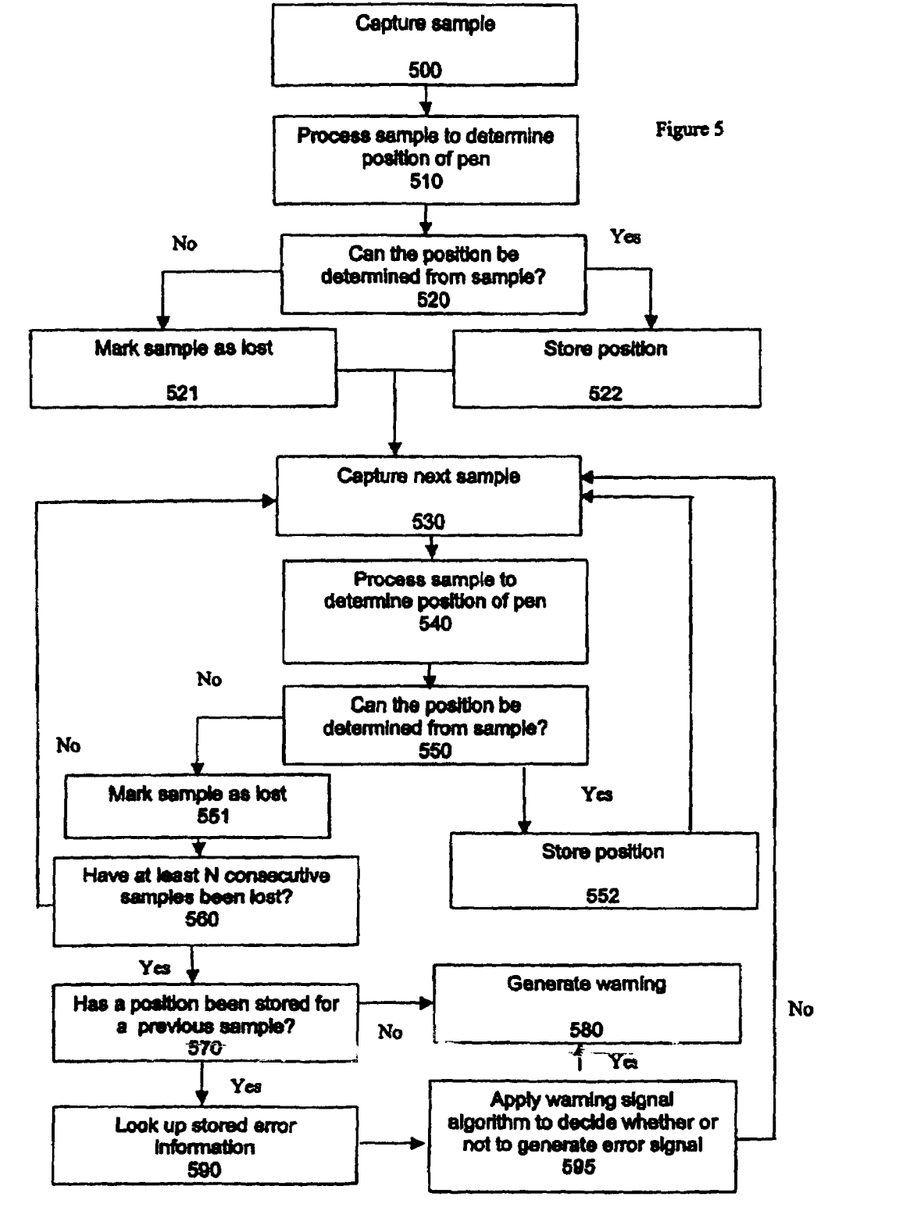
FIG. 5 is a flow diagram showing the steps performed when capturing and processing information by the pen of FIG. 4 in a method according to a further embodiment of the invention.

Referring to FIG. 5, in a first step 500, after the pen 300 detects from the pressure sensor that the pen has been pressed onto the document, a first sample is captured at the start of a stroke and the pen processes 510 the sample to identify the pattern and hence position of the pen on the document. The start of a stroke is identified by the change of the pressure switch output to indicate that the pressure has exceeded a predetermined threshold.

The pen 30 checks 520 from the processing whether or not the position of the first sample can be determined from the pattern it contains. If the position cannot be determined from the captured image the sample is marked 521 as a lost sample. If the position can be determined, the position indicated by the sample is recorded 522 in memory 322 along with the time of capture of the sample.

The next image sample is then captured 530 and processed 540 to again identify the position of the pen 300 on the document 100. The second processed sample is then analysed 550 to see if its position can be determined. If the position can be determined from this sample the position is again recorded 552. If the position cannot be determined then the sample is marked 551 as lost. This process continues for each sample in the stroke.

Whenever at least N consecutive lost samples are flagged in the memory as lost 560 the pen 300 determines 570 whether or not a position has been recorded for a previous sample in the stroke. If not, then a warning is generated as the capture of the stroke has been unsuccessful and the pen 300 cannot determine the region of the document 100 in which the pen stroke has been made. The value of N may typically be set at 3, 4 or 5.

If a position has previously been recorded for the stroke, the appropriate warning behaviour is determined 590 from warning information stored in the memory 322 of the pen 300. The pen determines from the stored error information whether the previous sample, or any other sample within the stroke that is not a lost sample, corresponds to a position within a region of pattern which is of "low" or "high" error tolerance.

An algorithm 595 is then applied to the captured strokes which takes into account the warning condition associated with the pattern region, and hence the document region, in which each stroke has been made. In this example, if the stroke is in a region that is low tolerance, the pen provides a warning to the user that the stroke is not captured correctly. If it is a high tolerance region then no warning signal is produced 592. In an alternative arrangement a warning may be produced for a stroke in a high tolerance region when a higher number of consecutive lost samples is recorded.

Altering the behaviour of the pen based on information pre-stored in the pen memory makes the capture of strokes more robust in areas where high accuracy is not needed such as tick boxes whilst maintaining the require high degree of accuracy in other areas where more fine stroke detail is needed.

Depending on the design of the document, it may be that pen strokes will be made that are partly in one region of the document and partly in another, the two regions having different warning conditions associated with them. In this case the algorithm can be arranged to select, for example, the warning condition associated with either the beginning of the stoke, or the end of the stoke.

Figure 6:
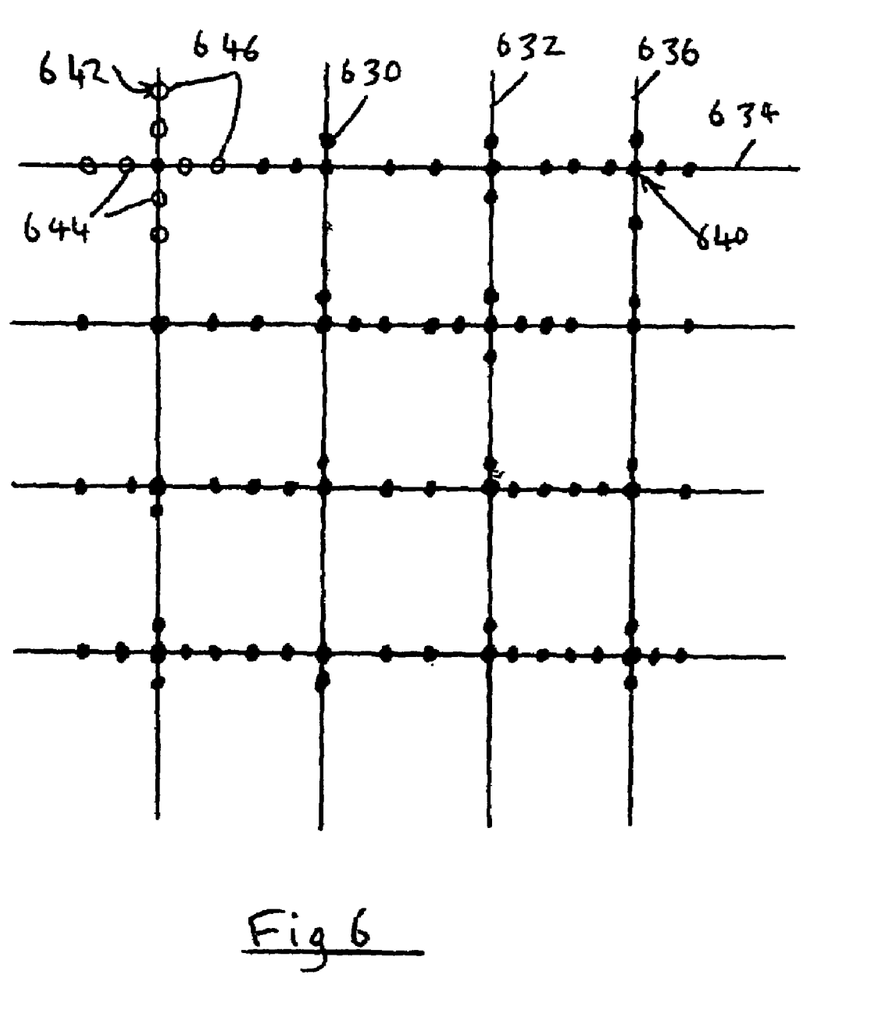
FIG. 6 is a schematic diagram of pattern applied to a document according to a further embodiment of the invention.

Referring to FIG. 6, in a second embodiment of the invention, rather than identifying the different regions of the document on the basis of a map stored in the pen, they are identified by data coded in the pattern 606 on the document. In this embodiment the pattern 606 is made up of a number of black ink dots 630 arranged on an imaginary grid 632. The grid 632, which is shown in FIG. 6 for clarity but is not actually marked on the document, can be considered as being made up of horizontal and vertical lines 634, 636 defining a number of intersections 640 where they cross. The intersections 640 are of the order of 1.3 mm apart, and the dots 630 are of the order of 100 μm across. A group of dot positions 642 is associated with each intersection 640. Each group comprises one dot position at which there is a central dot 641 at the intersection 640. This identifies the grid. Four position identification dot positions 644 are arranged around the central dot 641. The presence or absence of dots in each of these positions is used to code positional data identifying the position on the document. For example any group of nine intersections 640 will encode sufficient positional data to identify it uniquely within a very large defined area of the pattern. Therefore if a reading device is arranged to image an area of nine intersections, it can determine the position of the imaged pattern in the pattern space. Four further dot positions 646 are arranged on the grid lines 634, 636 outside the position identification dot positions 644, and the presence or absence of dots in these positions is used to encode further data, in this case the warning information. The warning information will generally be constant over any particular region or area of the document, for example within the send box 122 of the document of FIG. 1. In the example shown in FIG. 6, the communication data component of the pattern 606 includes two dots in the positions 646 on the horizontal grid lines 634, but no dots on the corresponding positions on the vertical grid lines 636. This can be detected provided the orientation of the pattern can be determined from the position identification component. If this is not possible, then simply the number of dots at each intersection 40 in the warning condition component of the pattern can be used to encode the warning information.

In this case the warning conditions are not stored in the form of a map, but as a simple look-up table or the like. The processor in the pen is arranged, for each sample, to extract the data from the pattern 606, identify the position identification data and the warning condition data, and use the warning condition data together with information about any lost samples to determine whether a warning should be produced.

It will be appreciated that more than two warning conditions could be used for any one document. For example check boxes, character recognition areas, drawing areas and other types of areas could all have different warning conditions associated with them that are appropriate to them.

The invention claimed is:

1. A digital pen and paper system comprising a pen arranged to make pen strokes on a document having a plurality of regions, to detect markings on the document, and to record them in a series of samples, wherein: the system is arranged to determine from the samples the position of the pen strokes; the system has defined therein a plurality of different warning conditions that determine when a warning will be produced in response to lost samples; and the system is arranged to select one of the warning conditions for one of the pen strokes depending on which of the regions the pen stroke is made in.

2. A system according to claim 1 that is arranged to identify which of the regions the pen stroke is made in by means of the markings.

3. A system according to claim 2 that is arranged to identify the position of one of the samples from the markings, and to identify a region of the document on the basis of the position.

4. A system according to claim 3 having stored therein a map defining regions of the document and the warning conditions associated with the regions.

5. A system according to claim 2 arranged to identify in the markings a position identifying pattern component and a warning information pattern component, and to identify one of the regions on the basis of the warning information pattern component.

6. A system according to claim 1 that is arranged to identify any sample for which it cannot determine an associated position as a lost sample.

7. A system according to claim 1 that is arranged to produce a warning if the warning condition associated with the pen stroke is met.

8. A system according to claim 1 wherein the warning conditions define respective numbers of lost samples.

9. A system according to claim 1 wherein the pen includes a camera arranged to capture the samples.

10. A digital pen and paper system which includes a digital pen having a writing stylus adapted to write handwritten markings onto a surface and which is adapted to capture those handwritten markings digitally, in which the system is adapted to behave in a different way when processing information captured from different regions on a document, and in which the differing behaviour comprises different decisions about warnings to be issued to a user to indicate that information has been captured incorrectly by the pen.

11. Apparatus according to claim 10 wherein the pen is arranged to carry out the processing.

12. A method of processing pen stroke data samples from a digital pen and paper system, the method comprising: determining from the samples which of a plurality of regions of the document a pen stroke has been made in; and selecting one of a plurality of different predetermined warning conditions that determine when a warning will be produced in response to lost samples; wherein the warning condition for the pen stroke is selected depending on which of the regions the pen stroke is made in.

13. A method according to claim 12 further comprising producing a warning if the warning condition is met.

14. A method according to claim 12 which comprises capturing a sequence of samples for a pen stroke, identifying a group of lost samples in the sequence, determining whether the position of the stroke can be sufficiently identified, and if it can, selecting a warning condition to determine whether a warning should be produced in response to the lost samples.

15. A method according to claim 14 further comprising the step of, if the position of the stroke cannot be sufficiently identified, selecting a default warning condition.

16. A computer program stored on a physical computer-readable medium, said program, when running on a processor of a document information capture device, causes the device to perform the method of claim 12.

17. A program according to claim 16 in which the device comprises a digital pen which forms part of a digital pen and paper system.

18. A data carrier comprising a physical computer-readable medium which has recorded thereon program instructions which, when running on a processor of a document information capture device, cause the device to perform the method of claim 12.

19. A physical, computer-readable memory which has stored therein warning information for use in the apparatus of claim 1.

20. A digital pen system comprising a pen adapted to repeatedly read position determining information from a surface, such as a document, the system thereby being arranged to determine the position of the pen relative to the surface as it moves relative to the surface, the system being configured to monitor failed attempts to read the position determining information and to generate a reading error signal in dependence upon one of a plurality of rules, the rule being selected in dependence upon a recently determined position of the pen relative to the surface.

\* \* \* \* \*